(12) United States Patent
Fritzer et al.

(10) Patent No.: US 6,676,561 B2
(45) Date of Patent: Jan. 13, 2004

(54) TORQUE TRANSFER SYSTEM FOR A MOTOR VEHICLE

(75) Inventors: Anton Fritzer, Markdorf (DE); Franz Bitzer, Landau (DE); Rainer Eidloth, Bamberg (DE); Carsten Weinhold, Buhl (DE); Thomas Jager, Buhl (DE); Martin Vornehm, Buhl (DE); Hans-Jürgen Renk, Lichtenau (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 09/995,254

(22) Filed: Nov. 27, 2001

(65) Prior Publication Data

US 2002/0084129 A1 Jul. 4, 2002

Related U.S. Application Data

(63) Continuation of application No. PCT/DE00/01684, filed on May 25, 2000.

(30) Foreign Application Priority Data

May 27, 1999 (DE) .......................... 199 24 222

(51) Int. Cl.[7] .................. F16D 48/06; B60K 41/02; F16H 59/52; F16H 59/66
(52) U.S. Cl. .................. 477/70; 477/901; 477/174; 701/67; 701/94; 123/339.16
(58) Field of Search .................. 477/70, 83, 174, 477/900, 901; 701/94, 110, 67; 123/339.16

(56) References Cited

U.S. PATENT DOCUMENTS

| 4,804,074 A | * | 2/1989 | Kori | 477/74 |
| 4,850,249 A | * | 7/1989 | Kirstein | 477/97 |
| 4,911,275 A | | 3/1990 | Ohkumo et al. | |
| 5,406,862 A | * | 4/1995 | Amsallen | 74/336 R |
| 5,769,752 A | * | 6/1998 | Kim | 477/114 |
| 6,128,899 A | * | 10/2000 | Oono et al. | 60/295 |

FOREIGN PATENT DOCUMENTS

| DE | 3112777 A1 | 10/1982 |
| DE | 3516143 A1 | 11/1985 |
| DE | 4213589 A1 | 11/1992 |

* cited by examiner

Primary Examiner—Ankur Parekh
(74) Attorney, Agent, or Firm—Darby & Darby

(57) ABSTRACT

A torque transfer system of a motor vehicle has a clutch, a transmission, a control device, and a traction load detecting device. The traction load is the variable resistance that a vehicle has to overcome to start or to keep moving, e.g., going uphill or downhill, with a heavy or light load, with or without a trailer or a roof load. The control device controls the torque transfer system, in particular the clutch, dependent on input signals received from the traction load detecting device.

37 Claims, 4 Drawing Sheets

TORQUE TRANSFER SYSTEM FOR A MOTOR VEHICLE

This is a continuation of international application Ser. No. PCT/DE00/01684, filed May 25, 2000, the entire disclosure of which is hereby incorporated by reference.

BACKGROUND OF THE INVENTION

The invention relates to a torque transfer system for a motor vehicle, a method of operating the torque transfer system, and a method of operating the motor vehicle that comprises utilizing the torque transfer system.

A torque transfer system in the particular context of the present invention means an arrangement or system that includes a clutch device and/or a torque converter device and/or a transmission. The torque transfer system has at least one input shaft and one output shaft, where the rotary transfer quantities carried through the input shaft and the output shaft may be equal or different in magnitude.

A rotary transfer quantity within the present context means a torque or a rate of rotation (rpm rate, for short). A torque transfer system of the kind that the present invention aims to improve is preferably configured so that it can at least part of the time uncouple at least one input shaft and at least one output shaft from each other.

As a matter of terminology, it should be noted that the term "torque-transmitting device", which will also be used herein, has a different meaning from "torque transfer system". The torque transfer system proposed by the present invention preferably includes a torque-transmitting device as a component.

The term "clutch device" as used herein refers to a device that includes a clutch that can be engaged and disengaged, such as a friction clutch and/or a start-up clutch and/or a reverse-gear clutch and/or a laminar disc clutch and/or a magnet powder clutch and/or a converter bypass clutch. With particular preference, the clutch device is configured as an automated clutch device of the kind which the assignee of the present invention describes and offers for sale under the name "Electronic Clutch Management" (ECM).

A transmission device in the particular context of the present invention means a device by which different transmission ratios can be set. The selection of transmission ratios may be either continuous, i.e., without steps, or it may have a finite number of discrete levels or steps. Examples of transmission devices envisaged here include manual shift transmissions, multi-step transmissions, cone-pulley transmissions and the like. In particular, the transmission device consists of an automatic transmission, preferably of the type that uses a planetary gear mechanism and can be shifted without interrupting wheel traction. As an alternative, the transmission device may also be an automated shift transmission. The term "automated shift transmission" as used herein means a transmission with a gear layout analogous to a manual transmission with the addition of automated controls for at least a part of the shift movements, and in particular for all of the shift movements. An actuating device is provided for the automated controlling of the shift movements, including in particular a hydraulic device with a piston/cylinder arrangement and/or at least one electric motor.

In the context of the present invention, the terms "torque transfer system", "clutch device" as well as "transmission device" also include combinations of the aforementioned representative embodiments of the different devices.

The known state of the art already includes torque transfer systems with an automated clutch device and a transmission device in which the respective shift movements of the clutch device and the transmission device are performed in coordination with each other. Devices of this kind are known in particular for the automated movement of the clutch. Although these known devices are already proven in practical use, it would seem desirable to develop them further to make them more adaptable and more flexible for certain operating states and traction load states of a motor vehicle.

The terms "traction load" and "traction load state" in the context of the present invention refers in particular to extraneous factors of the vehicle, e.g., the position and orientation of the vehicle on a road surface, which may increase the driving resistance in relation to a predetermined reference resistance in at least one driving direction. Of particular interest in the present context are situations that lead to an increase in driving resistance dependent on the direction of travel.

A reference resistance in the present context means a specific amount of driving resistance encountered by the motor vehicle when traveling on a level surface at normal atmospheric pressure, with a normal air drag coefficient ($C_d$) of the vehicle without accessory structures such as a rooftop carrier or a trailer or the like, and at a specified total weight defined specifically as 75 kilograms above the weight of the empty vehicle.

Some traction load states considered in the context of the present invention relate to conditions where the driving resistance is higher than under the aforementioned normal reference conditions. An increased driving resistance may be due to the fact that the vehicle is traveling up an incline or that the vehicle is pulling a trailer.

OBJECT OF THE INVENTION

The invention therefore has the object of providing a torque transfer system for a motor vehicle as well as a method of operating the torque transfer system, offering a cost-effective and technically simple solution for performing rapid and precise shift movements adapted to traction load conditions of the vehicle, leading to a higher level of driving comfort.

SUMMARY OF THE INVENTION

The proposed solution according to the invention is to provide a torque transfer system for a motor vehicle with a control device that is at least part of the time connected to a traction-load detecting device with at least one sensor device to determine the traction load of the vehicle.

The torque transfer system, which specifically includes a clutch device and a transmission device, is appropriately configured so that it can be arranged in the power train of a motor vehicle between an input shaft and an output shaft.

The term "drive source" in the present context means in particular a motor or a combustion engine or the like. The terms "downstream side" or "output side" refer to a shaft that is arranged in the power train between the transmission device and the wheels of the vehicle. It should be noted that a vehicle with a torque transfer system according to the invention may also be set in motion with a torque flowing in the upstream direction of the power train. This can particularly be the case, if a vehicle parked on an incline is set into motion by disengaging the transmission lock and/or the clutch without depressing the accelerator pedal, i.e., by using the downhill component of the gravity force.

The torque transfer system can be shifted between different operating states that affect the ratio between the rotary transfer quantities. In particular, a clutch device that is part of the torque transfer system may be taken out of engagement, so that the input shaft and the output shaft are essentially uncoupled from each other. On the other hand, the clutch device may also be shifted into complete engagement so that, with the transmission in gear, the input shaft and the output shaft are positively coupled to each other. Further according to the invention, the clutch device is designed so that it can operate in a state where a predetermined amount of torque is transmitted through the clutch device.

In particular, the transmission device is designed to operate with two or more different transmission ratios.

The control device can set the torque transfer system into the different operating states according to a predetermined characteristic relationship.

A control device in the sense of the present invention specifically has the capability to engage the clutch device to a degree where the vehicle is moved in a crawl mode.

A crawl mode in the present context means that the vehicle is moving at a slow speed with a gear engaged, with the engine running, and without applying the brakes. The amount of torque transmitted through the clutch device in this operating state is small. In particular, according to the invention, the torque that the clutch device is allowed to transmit is limited to a predetermined small amount.

The present invention further provides that the control device is designed to manage a start-up phase of the vehicle from a stand-still condition. In a start-up phase, an engine-load control lever, usually a gas pedal, is actuated by the driver so that the drive source runs at a higher rpm rate than the idling speed, and at least a small amount of clutch engagement causes the vehicle to slowly begin to move.

In particular, the invention provides that the control device regulates the crawl movement and/or start/up movement of the vehicle in accordance with a predetermined characteristic relationship that may be defined through mathematical functions, data arrays, curve fields or the like.

A traction load sensor device in the present context means a device with at least one sensor.

As a preferred arrangement, the traction load sensor device detects or monitors the value of a characteristic quantity of a kind that allows the traction load detecting device or the control device to determine the traction load state of a vehicle without resorting to a comparison or comparative mathematical evaluation of operating quantities of the input and output ends of the power train. In particular, the invention calls for a sensor device that can detect the traction load independent of a comparison of vehicle accelerations which, in turn, are based on the engine torque and on at least one wheel rpm rate. Nevertheless, this approach is not excluded under the invention as a way to determine the traction load of the vehicle.

According to the invention, a control device is at least part of the time connected to a traction load detecting device through an analog or digital data connection and is equipped to generate a signal that is a function of the traction load state of the vehicle and allows a determination of the traction load of the vehicle independent of a comparison or, in particular, a comparative mathematical analysis of operating quantities at the engine side and the wheel side of the power train.

With the aforementioned analog or digital connection between the control device and the traction load detecting device, the connected devices can be spatially separated from each other, or one of the devices could be part of the other. The data transmission from one device to the other may be implemented through a wireless connection or through a cable or other conducting element. The signal that is transmitted through the connection may be a variable analog signal or a discrete signal. Also among the preferred solutions, the transmitted information may be in the form of a digital signal. In particular, a digital signal may indicate whether the traction load is at the reference level or at an increased level.

A traction load detecting device in the sense of the present invention may in particular include an inclination angle detecting device. The latter may produce a sensor signal that is a function of the angle at which the vehicle is inclined in relation to a horizontally leveled position.

An inclined vehicle position in the present context means in particular that the vehicle is inclined lengthwise or side-to-side or in both directions in relation to a level plane.

As a preferred concept of the invention, at least one characteristic value of the driving properties of the vehicle and/or the torque transfer system is controlled by the traction load detecting device and/or the control device and/or the inclination angle detecting device in accordance with a predetermined characteristic.

With preference, the traction load sensing device is arranged substantially on the transmission device and/or the control device.

Preferably, the traction load sensing device has a sensor arrangement with at least one sensor in the fuel tank of the motor vehicle. There are preferably two sensors, and with particular preference three sensors, arranged in the fuel tank of the vehicle.

One preferred use for this sensor arrangement or of the at least one sensor is to detect the fill level of the fuel in the tank.

In accordance with a highly preferred embodiment of the invention, the sensor arrangement in the fuel tank can serve at least part of the time to detect the shifts in the position of the fuel, preferably through a high-frequency detection principle, and to generate an inclination angle signal. In particular, a sensor arrangement of this type can detect the position changes of the fuel in the tank when the vehicle travels uphill or downhill, in comparison to the condition of the fuel when the vehicle travels on a level surface. It is particularly preferred, if the sensor arrangement also detects the direction of the change in position of the fuel.

A inclination-angle signal, which is a function of the information collected by the sensor arrangement, is transmitted to the control device.

According to a particularly preferred embodiment of the invention, the signals detected by the tank sensor arrangement, which are representative of the tank fill level, are evaluated by the control device for different time windows of different lengths. From the change in the fill level within the time windows, or from a comparison of fill levels of at least two time windows, and/or from a comparison of the time gradients of the fill level within different time windows, the control device determines if and by how much the fuel volume in the tank has changed and/or whether the inclination angle of the vehicle has changed, or the amount of the inclination angle at which the vehicle is currently positioned.

The term "time window" in the present context means a time period of predetermined length, or which begins at a predetermined point in time, particularly controlled by the occurrence of an event, and/or ends at a point in time that is controlled by an event.

Preferably, three time windows are used for the data evaluation, with a first time window extending over a long time period, a second time window extending over a mid-sized time period, and a third time window extending over a very short time period.

Under a particular concept of the invention, the time windows under evaluation run at least in part concurrently. Preferably, the third time window is contained within the second window, and the second window is contained within the first window.

In particular, the evaluation of the change in fill level detected during the first time window can be used to determine a change in the fuel volume in the tank. The change in fill level registered during the second time window can be used in particular to determine a change in the inclination angle of the vehicle. The change in fill level detected during the third time window is preferably used as an indicator of a short-term irregularity. A particular example of a short-term irregularity occurs when the vehicle encounters a pothole in the pavement.

As a preferred concept of the invention, the evaluation of the time windows further involves characteristic operational quantities of the vehicle such as the gas pedal position, or the gear being used in the transmission, or the transmittable amount of torque through the clutch, or the engine torque, or the engine rpm rate, or other data, which are evaluated in accordance with a predetermined characteristic.

According to a particularly preferred embodiment of the invention, a fuel tank sensor is arranged in the middle of the tank. Preferred arrangements further include a tank sensor at an out-of-center location of the tank, or two sensors, one of which is located at the center and the other is located out of the center. With particular preference, the second tank sensor is offset from the center of the tank in the lengthwise direction of the vehicle. Other preferred arrangements include one tank sensor in a corner of the tank, or two tank sensors in diagonally opposite corners of the tank, or two tank sensors in different corners of the tank, or two tank sensors in opposite corners of the tank in relation to the transverse direction of the vehicle. With particular preference, one tank sensor is arranged at the center of the tank, while two further tank sensors are arranged at opposite corners of the tank in relation to the transverse direction of the vehicle. Also with particular preference, at least one tank sensor is arranged in the proximity of a wall of the tank.

Preferably, one or more tank sensors, and with the highest preference all of the tank sensors, are arranged so that they can detect the fill level all the way to the point where the tank is empty.

In the present context, the middle or center of the fuel tank means in particular the area center of gravity of a horizontal cross-section through the tank, i.e., of the area that is delimited by the intersection of the imaginary cross-sectional plane with the walls of the tank. The foregoing references to the corners of the fuel tank are specifically meant as the corners of the imaginary cross-sectional area.

According to a particularly preferred embodiment of the invention, the control device determines the inclination of the vehicle on the basis of the differences in the fill heights that are detected by different sensors at the same point in time. It is particularly preferred if the sensors are arranged so that the lengthwise inclination of the vehicle can be determined. Preferred embodiments of the invention further include sensor arrangements by which the transverse inclination can be detected as well as arrangements by which both the lengthwise and transverse inclination of the vehicle can be determined.

With preference, the traction load sensor arrangement includes at least one acceleration sensor arrangement.

An example of an acceleration sensor is represented by a collision sensor, also known as crash sensor. The term "crash sensor" relates in particular to sensors or sensor devices that can be used in motor vehicles to trigger the deployment of an air bag or other safety devices.

Preferably, the acceleration sensor detects the actual vehicle acceleration, particularly in terms of absolute amounts of acceleration. As a preferred concept, the acceleration sensor is designed to provide acceleration data also when the vehicle is standing still, if an acceleration is present. For example, a sensor for detecting acceleration in the traveling direction would also indicate an acceleration if the longitudinal axis of the vehicle is inclined in relation to a level plane. This situation applies when the vehicle is standing still on an uphill or downhill grade. The reason why the acceleration sensor registers an acceleration is that the vector of the gravitational force has a component in the lengthwise direction of the vehicle. The effective acceleration in the lengthwise direction of the vehicle is in essence represented by g×sin α, where α represents the angle of lengthwise inclination of the vehicle in relation to a horizontal plane and g represents the acceleration due to gravity.

With preference, the control device determines the inclination of the vehicle at least part of the time from changes in vehicle acceleration, particularly from the absolute amounts of acceleration as determined by the traction load sensing device.

According to a particularly preferred embodiment of the invention, the grade angle of the pavement on which the vehicle is traveling is determined on the basis of the time profile of the acceleration values detected by the acceleration sensor. The inclination of the vehicle can be determined in particular on the basis of the acceleration values generated by an acceleration sensor in combination with at least one further characteristic operational quantity such as, e.g., the wheel rpm rate of the vehicle.

The invention further proposes the concept that a control device controls the torque transfer system dependent on a signal that is transmitted from a traction load detecting device to an optical device.

The traction load detecting device is generally of a type as described herein. However, the traction load detecting device may also work in any other possible manner to generate a signal that is representative of the traction load.

An optical device in the present context means in particular a device that provides an optical indication of a specific traction load condition. This includes in particular a blinking light that is arranged in the display panel of the vehicle and operated by a control device, or a control light for the presence of a trailer, or other luminous indicators.

With preference, the signal transmitted to the optical device is used for the selection of a shift program and/or a clutch-engagement/disengagement characteristic, or for the control of the start-up rpm rate, or to effect a change in the crawl torque.

In particular, the invention proposes to increase the start-up rpm rate if the presence of a trailer has been detected and/or to adjust the crawl torque to a higher traction load which may be caused by a trailer or other factors.

Among the preferred possibilities, the signal transmitted to the optical device, preferably an electrical signal, is present only when the vehicle is connected to a trailer.

According to the invention, the clutch device that is part of a torque transfer system is under certain conditions partially retracted from engagement as a result of a control signal of the sensor device. The control signal depends on a predetermined characteristic operating value that is controlled according to a predetermined characteristic. The clutch device is taken out of engagement in particular when the characteristic operating value reaches a predetermined threshold.

According to the invention, the predetermined threshold of the characteristic operating value depends in particular on the signal generated by the traction load detecting device in accordance with a predetermined characteristic.

According to the invention, the characteristic operating value can be the engine rpm rate and/or the transmission rpm rate of a motor vehicle. Specifically, the invention proposes the concept of disengaging the clutch at a transmission rpm rate of, e.g., 1000 rpm under predetermined conditions while the vehicle is traveling on a level road without a trailer. If the vehicle is traveling on a downhill grade, the transmission rpm rate at which the clutch is disengaged is preferably set at a lower value dependent on the detected traction load state.

As a notable feature of the invention, the clutch device is controlled by the control device preferably in a such manner that the amount of torque that is transmittable through the clutch is immediately reduced if the transmission rpm rate falls to a predetermined level, known as the clutch-disengagement threshold. By reducing the amount of torque carried through the clutch, the latter will be put into a slipping state, so that the transmission rpm rate and the engine rpm rate will increasingly diverge. As a consequence, in a situation where the vehicle is traveling downhill, the transmission rpm rate may increase because of the torque entering the power train from the output side, while the engine rpm rate changes towards the idling rpm rate, i.e., decreases. At the point where the transmission rpm rate has risen to a predetermined value, which may be set at 1200 rpm, the clutch device is controlled according to another subroutine of the control characteristic. As a preferred possibility for this control phase, the target value for the transmittable clutch torque, which prior to that point was regulated at a constant level, is now controlled by setting separate targets for the portions allocated to slippage and to driving the vehicle. As a result of this control, the target torque value for the transmittable torque is strongly increased. This will cause the transmission rpm rate to decrease and, at least after a certain time, it will cause the gap between the engine rpm rate and the transmission rpm rate to become increasingly smaller, until the two rpm rates are synchronized again.

The rpm threshold at which the clutch disengagement is initiated and thus the level of transmittable torque is drastically reduced, is set for example at 1000 rpm for an operating situation where the vehicle is traveling on level ground. If it has been detected that the vehicle is traveling on a downward grade, this value is set lower. For example in Diesel vehicles, the threshold is reduced to a value that is 100 rpm above the idling rpm rate.

The foregoing feature of the invention is advantageous in that an early disengagement of the clutch, i.e., disengaging the clutch at a higher rpm rate, is beneficial to the driving comfort of the vehicle. Particularly with a strong application of the brakes when traveling on level ground, an early disengagement of the clutch prevents stalling of the engine.

However, when traveling on a downhill grade, an early disengagement of the clutch has the consequence that the vehicle will be rapidly accelerated by gravity to a speed where the transmission rpm rate will again reach 1200 rpm, where the clutch will re-engage. The time interval where traction is interrupted may in this case be too short, for example to shift gear.

By reducing the rpm threshold for clutch disengagement, the time period between the disengagement and re-engagement of the clutch can be made longer, which in particular makes gear-shifting more comfortable.

The invention also provides measures to avoid a cyclic alternation between engagement and disengagement of the clutch when traveling along a downhill grade.

Preferably, the transmission device can additionally be controlled by the driver of the vehicle through a selector lever which allows the driver, e.g., to set a mountain-driving gear. As a particularly preferred feature, the setting of the mountain-driving gear will generate a signal to the control device to select a different characteristic for controlling the clutch.

According to a particularly preferred embodiment of the invention, the traction load detecting device can generate a signal that indicates whether the vehicle is connected to a trailer.

Further according to the invention, the control device may control certain designated operating quantities of the vehicle and/or of a drive source of the vehicle and/or of the torque transfer system in accordance with a predetermined characteristic and based on the signal generated by the traction load detection device.

With preference, the start-up rpm rate of the motor vehicle is controlled as a function of the traction load.

The start-up rpm rate in the present context is defined in particular as the controlled rpm rate during the start-up phase.

A start-up phase in the sense of the present context is in particular a process in which an engine-load control lever such as a gas pedal is being actuated, where the engine rpm rate is in essence above the idling rpm rate and the vehicle is starting to move at least slowly as the clutch is engaged at least to a minor extent.

According to a particularly preferred embodiment of the invention, the control device under certain conditions regulates the clutch device in such a manner that the latter transmits a crawl torque of a magnitude that depends on a signal generated by the traction load detecting device.

It should be noted that a crawl torque in the present context is defined as a torque of small magnitude, which can be transmitted by the clutch device when the vehicle engine is running and neither the brake nor the gas pedal are being applied by the driver.

According to a particularly preferred embodiment of the invention, the control device will cause the crawl torque to increase if the signal generated by the traction load detecting device indicates certain predetermined traction load conditions. One such traction load condition may be the fact that a trailer is connected to the vehicle, or that the traction load caused by the trailer exceeds a given traction load limit, or that a certain grade angle is exceeded, or any other condition that affects the traction load on the vehicle.

According to a particularly preferred embodiment of the invention, the control device will initiate a predetermined driving program in response to a signal generated by the traction load detecting device. A driving program in this particular context consists of a given characteristic functional relationship according to which the torque transfer system or, more specifically, the transmission device and the clutch device are controlled.

By selecting a driving program that depends on the traction load condition of the vehicle, it is possible to provide a variable clutch engagement/disengagement characteristic and/or a variable gear-shifting characteristic, or other variations in automated functions of the torque transfer system.

In particular, the invention proposes a more rapid engagement of the clutch under conditions of increased traction load, i.e., especially with an increased gross vehicle weight or, in other words, with a heavy load, or when the vehicle is pulling a trailer.

This can be particularly advantageous for heavy vehicles or vehicles pulling a trailer, because the larger weight can have the consequence that a larger amount of energy is absorbed in the clutch, i.e., converted into heat. It is therefore desirable to reduce this energy dissipation, and one way to achieve this is by shortening the periods of clutch slippage through a more rapid re-engagement of the clutch.

According to a concept of the invention, the traction load condition of a vehicle is registered over a longer time period, and the registered data are subsequently evaluated. Based on the evaluation, a characteristic profile is determined, based on which traction load conditions can subsequently be predicted or can be detected more rapidly when they occur.

The evaluation results can, e.g., be made available when the ignition is switched on.

Also included under the scope of the invention is any process or method of operating a vehicle that makes use of the inventive torque transfer system or of the inventive methods and programs employed in the torque transfer system.

As a linguistic formality, where the names of features are connected by the word "or", this should be understood in the broadest sense, i.e., either as a logic type of or (one or the other or both) or an exclusive or (one or the other but not both), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
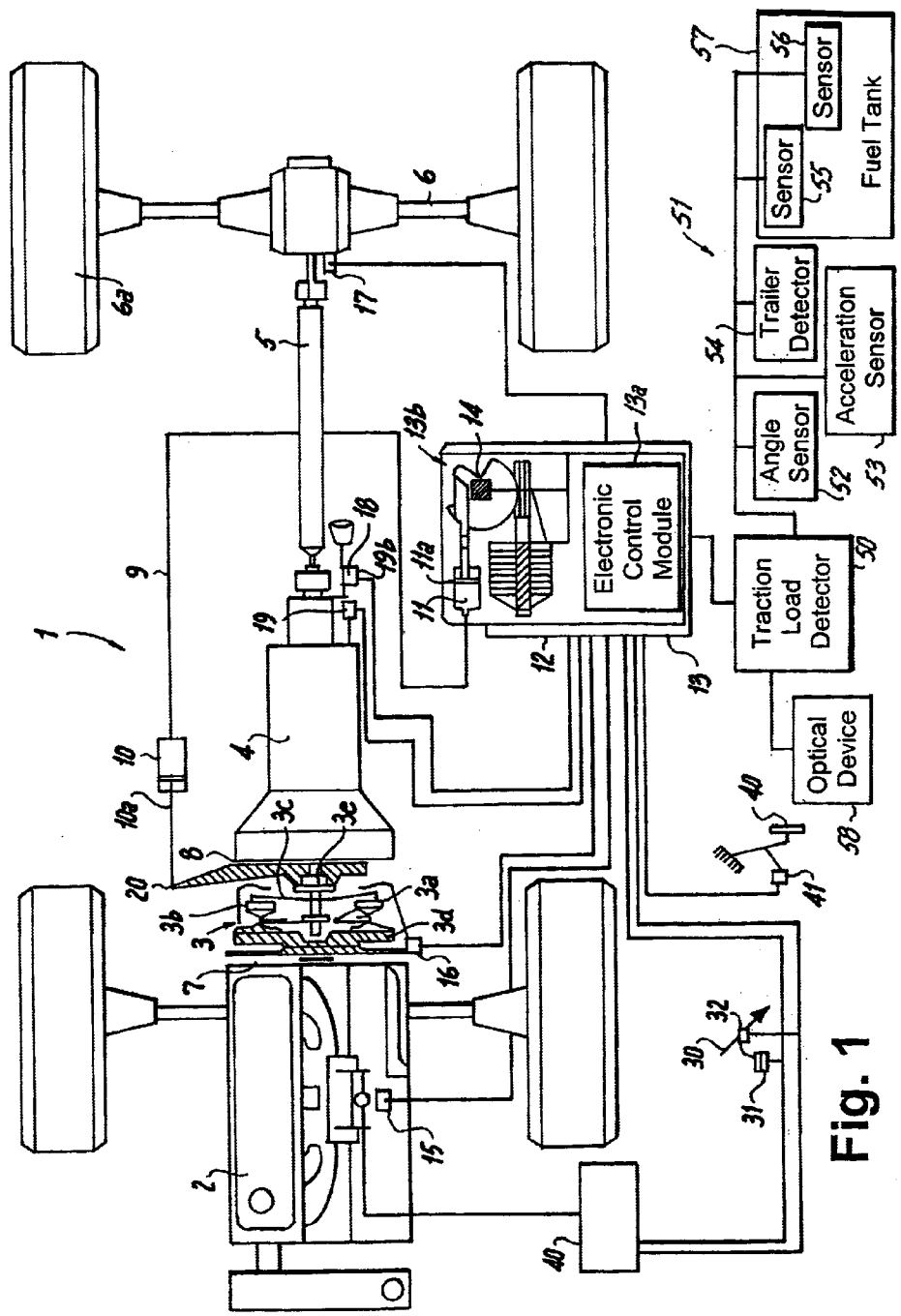
FIG. 1 represents a schematic view of a first example of an embodiment of the invention.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device.

The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19a and 19b. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake.

This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

As shown in FIG. 1, the electronic control module 13a of the control unit 13 is connected to a traction load detecting device 50 with an arrangement 51 of one or more traction load sensors that detect operating variables related to the traction load of the vehicle. The sensor arrangement 51 may include in particular an inclination angle sensor 52 and/or an acceleration sensor 53. A trailer detection device 54 may be provided to detect when a trailer is connected to the vehicle. As an alternative or in addition, the sensor arrangement 51 may include fuel tank sensors 55, 56 configured to detect the fuel level at two or more different points in a fuel tank 57 as a basis for determining the angle of inclination when the vehicle is in an inclined parking or traveling position. There can also be an optical device 58 connected to the traction load detecting device. In particular, this could be an indicator light on the dashboard to indicate when the vehicle is connected to a trailer.

Figure 2:
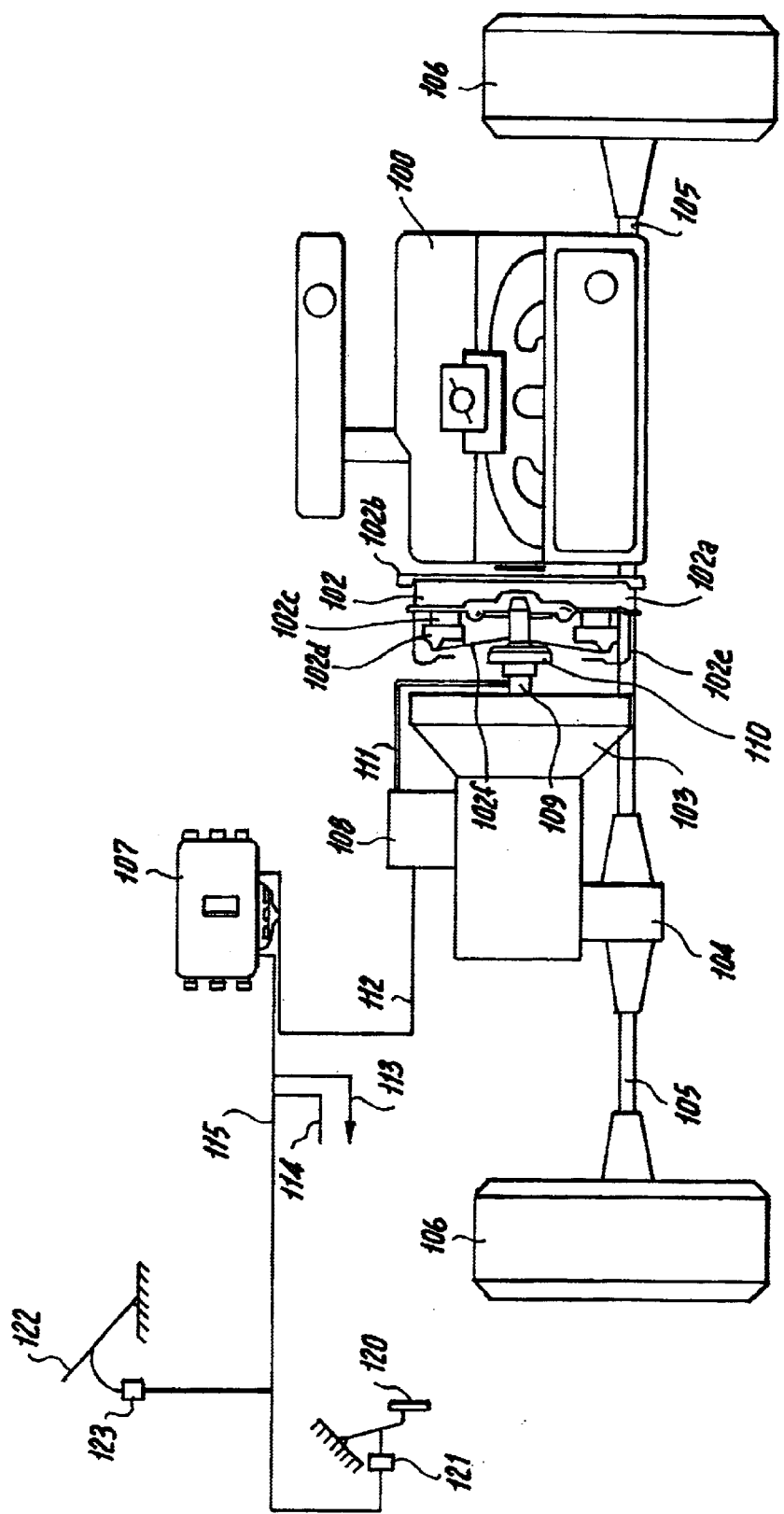
FIG. 2 represents a schematic view of a second example of an embodiment of the invention.

FIG. 2 gives a schematic view of a power train of a motor vehicle with a drive unit 100, a torque-transmitting device 102, a transmission 103, a differential 104, drive axles 109, and wheels 106. The torque-transmitting device 102 is arranged at or connected to a flywheel 102a. The latter as a rule carries an external tooth profile 102b that serves to start the engine. The torque-transmitting device has a pressure plate 102d, a clutch cover 102e, a diaphragm spring 102f, and a clutch disc 102c with friction linings. The clutch disc 102c is interposed between the pressure plate 102d and the flywheel 102a and may be equipped with a damping device. An energy-storing device such as a diaphragm spring 102f pushes the pressure plate axially towards the clutch disc. A release bearing 109 such as a hydraulically actuated concentric slave cylinder is used to actuate the torque-transmitting device. A release bearing 110 is arranged between the concentric slave cylinder and the prongs of the diaphragm spring 102f. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities such as the engine torque, that are correlated to the engine rpm rate through a characteristic relationship.

In a start-up process, essentially from a stationary or crawl-speed condition, if the gas pedal is actuated by an amount a, the engine control 40 will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the gas pedal displacement a by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The gas pedal displacement a is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to an indicator signal.

Figure 3:
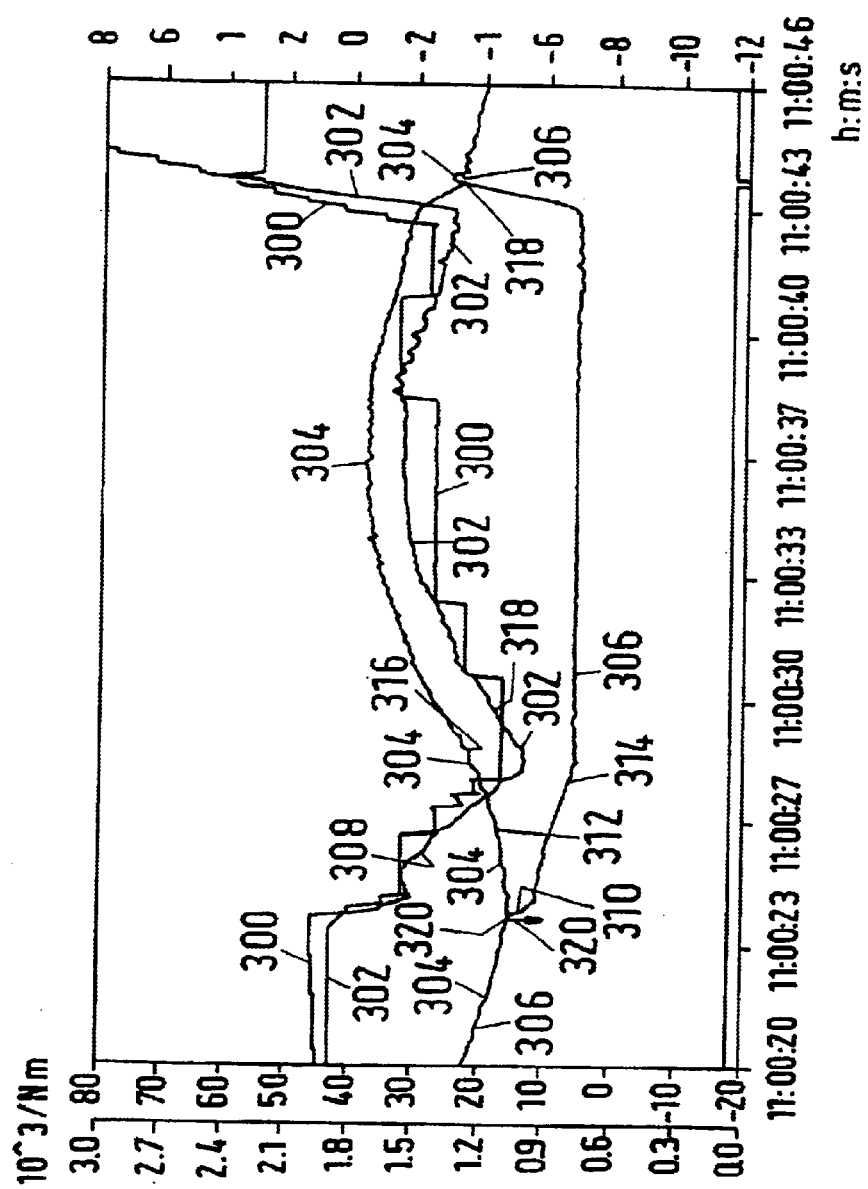
FIG. 3 represents a time graph of characteristic operational quantities to illustrate how the invention works in an exemplary embodiment of the invention.

FIG. 3 represents an example of a time graph of different characteristic operating quantities that may occur in a motor vehicle with a known torque transfer system traveling on an uphill grade. A change that occurs with the use of the present invention is schematically indicated.

The time profiles shown in FIG. 3 represent the actual clutch torque 300, the transmittable clutch torque 302, the transmission rpm rate 304, and the engine rpm rate 306. A clutch device is controlled by a control device in particular on the basis of a transmittable clutch torque 302 dependent on the transmission rpm rate 304. Particularly in a downhill coasting mode, if the transmission rpm rate 304, which at first runs synchronously with the engine rpm rate 306, has sunk to a predetermined value shown here as 1000 rpm to give a typical example, the transmittable clutch torque is set to a different value according to a changed characteristic. Under the changed control characteristic, the transmittable clutch torque 302 declines strongly as indicated by the portion 308 of the clutch torque profile 302. Particularly during this phase, the transmittable clutch torque is set dependent on a constant value. The decline of the transmittable clutch torque means in particular that the clutch can transmit only a reduced amount of torque. This has the consequence that beginning at the point 310, the transmission rpm rate 304 and the engine rpm rate 306 diverge from each other, so that slippage occurs in the clutch.

As the vehicle is accelerated by gravity along the downward grade, and as the engine-brake effect is at least reduced by the partial disengagement of the clutch, the transmission rpm rate rises strongly at first during the time phase 312. At the same time, the engine rpm rate 306 around 314 approaches the idling rpm rate. As soon as the increasing transmission rpm rate 304 has reached a predetermined value, which is schematically indicated at point 316, the target function for the clutch torque 302 is set anew according to a different characteristic, so that the targeted clutch torque 302 includes in particular a driving portion. This causes the targeted clutch torque to increase in the area 318, so that the clutch is moved increasingly into engagement. The progressive engagement of the clutch device has in particular the consequence that the time gradient of the transmission rpm rate decreases, because the more strongly engaged clutch increases the braking effect of the engine. However, at the beginning the transmission rpm rate continues to increase because the downhill acceleration due to gravity is at first still stronger than the decelerating effect of the gradually engaging clutch. Subsequently, however, the transmission rpm rate 304 will likewise decline. The engine rpm rate 306 rises from a certain point on, so that after the point 318, the engine rpm rate and the transmission rpm rate are again substantially synchronized.

When the vehicle travels on a downward grade, the control characteristic described above can lead to a cyclic behavior of the clutch device, meaning in particular a continuous alternation between engagement and disengagement of the clutch. In most situations, this kind of uncomfortable behavior is undesirable.

According to the invention, it is therefore preferred in a downhill travel phase, particularly if the downward grade is steeper than a predetermined angle, to reduce the clutch-disengagement threshold 320, i.e., the level of the transmission rpm rate 304 at which the clutch is taken out of engagement as symbolically indicated by the arrow 322.

Figure 4:
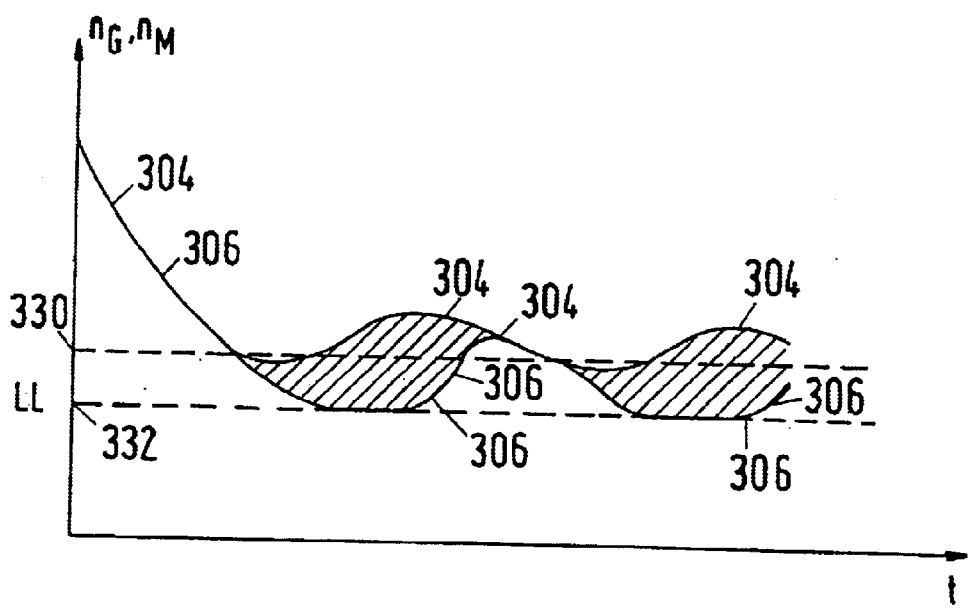
FIG. 4 represents a time graph of the transmission rpm rate and the engine rpm rate when a vehicle equipped with a state-of-the-art torque transfer system is traveling on a downward grade.

FIG. 4 shows an example of a time profile 304 of the transmission rpm rate $n_G$ and of a time profile 306 of the engine rpm rate $n_M$. The time profiles of FIG. 4 are representative of a downhill travel phase with a vehicle power train of the known state of the art.

As the vehicle is coasting downhill, the engine rpm rate 306 at first decreases synchronously with the transmission rpm rate 304. When a certain rpm rate 330 has been reached, the clutch is progressively taken out of engagement, so that the engine rpm rate 306 will seek the level of the idling rpm rate 332. The transmission rpm rate 304 rises at first, because the vehicle is accelerated by gravity and, as the clutch is progressively retracted from engagement, the braking effect of the engine is progressively diminished. When the clutch is progressively more engaged, the braking effect of the engine will increase, so that the time gradient of the transmission rpm rate sinks and continues into the negative range, while the engine rpm rate 306 rises because of the increasing engagement of the clutch. The engine rpm rate 306 and the transmission rpm rate 304 meet at point 334 and run synchronously during an immediately following time phase. However, during the synchronous time phase, the vehicle is further slowed down by the engine, so that the synchronous rpm rate 304, 306 decreases again to the clutch disengagement threshold 330. As the clutch is moved out of engagement, the rpm rates 304, 306 will again run apart. As soon as the rpm rate 304 has reached a predetermined level, the control device will intervene in the clutch device and cause the time gradient of the rpm rate to decrease, so that the rpm rates 304, 306 will move towards each other, continue synchronously for a limited time, and once again reach the clutch disengagement threshold. In an unfavorable case, this cycle may repeat itself many times over.

Figure 5:
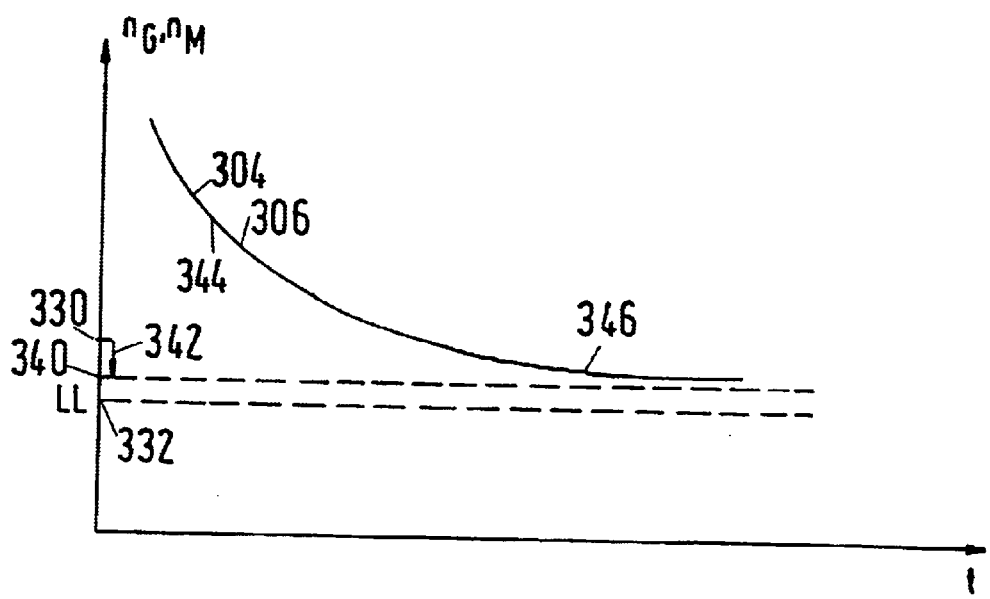
FIG. 5 represents a time graph of the transmission rpm rate and the engine rpm rate when a vehicle equipped with the torque transfer system according to the invention is traveling on a downward grade.

FIG. 5 illustrates in a schematic, exemplary manner the time graphs of the engine rpm rate 306 and the transmission rpm rate 304 in a downhill travel phase where a control device according to the invention manages the torque transfer system and in particular the clutch device. After the control device has registered that the vehicle is traveling downhill, the control characteristic for managing the clutch device is modified in such a manner that the threshold rpm rate for clutch disengagement is lowered, as indicated in FIG. 5 by the arrow 342 pointing downward from the level 330 to the reduced level 340. Accordingly, the clutch device does not disengage, particularly when coasting downhill, until the transmission rpm rate has reached the reduced clutch disengagement level 340. The clutch disengagement threshold 340 lies preferably above the idling rpm rate 332. The difference between the idling rpm rate 332 and the clutch disengagement threshold 340 should be selected appropriately, dependent on the principle on which the power source of the vehicle is based.

If the power source is a Diesel engine, the clutch disengagement threshold 340 is set preferably between 0 and 100 rpm higher than the idling rpm rate 332. With particular preference, the clutch disengagement threshold is set between 0 and 50 rpm, for example 40 rpm or 0 rpm, higher than the idling rpm rate 332.

With engines based on the Otto cycle, it is preferred to set the clutch disengagement threshold between 100 and 250 rpm higher than the idling rpm rate 332. For example, the clutch disengagement threshold for an Otto cycle engine may be set at 150 rpm above the idling rpm rate.

As a result of lowering the rpm threshold 340 for the clutch disengagement, the time phase is lengthened during which the transmission rpm rate and the engine rpm rate run synchronously during a downhill coasting phase. It is particularly preferred to set the clutch disengagement threshold 340 at a level where the vehicle ends up traveling at a significantly lower speed.

In the phase 344, the engine-brake effect is significantly larger than the gravity effect, so that the rpm rates 304, 306 show a pronounced decline. In the area indicated by the reference number 346, the rpm rate 304, 306 finds a balanced level slightly above the clutch disengagement threshold 340.

Thus, the cyclic alternation between engagement and disengagement of the clutch by which the prior art arrangements are afflicted is avoided by the torque transfer system according to the invention, by the inventive method of operating a torque transfer system, and by the inventive method of operating the motor vehicle which comprises utilizing the inventive torque transfer system.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A torque transfer system arranged in a power train of a motor vehicle with an engine, comprising an input shaft with an input rpm rate and an input torque, an output shaft with an output rpm rate and an output torque, a control device, and a traction load detecting device with at least one traction load sensor device, wherein:

the torque transfer system is operable to have an effect on an rpm ratio between the input rpm rate and the output rpm rate and on a torque ratio between the input torque and the output torque;

the torque transfer system is settable to and shiftable between a plurality of shift positions, said effect on the rpm ratio and the torque ratio being dependent on the shift positions;

the control device is operable to control the setting and shifting of a selected shift position among said plurality of shift positions in accordance with a predetermined shift-control characteristic;

the motor vehicle is subjected to a traction load, which is detected by the traction load detecting device through the at least one traction load sensor device; and the control device under predetermined conditions is connected to the traction load detecting device to receive from the latter a first traction load signal dependent on the traction load that has been detected, the torque transfer system comprises a transmission device and a clutch device;

the control device is further operable to generate a clutch control signal for controlling a state of engagement of the clutch device, whereby under certain conditions the clutch is taken at least partially out of engagement if a predetermined characteristic operating value has reached a predetermined threshold value, said predetermined threshold value being dependent on the first traction load signal in accordance with a predetermined characteristic relationship;

the traction load detecting device comprises an inclination angle detecting device that generates an inclination angle signal dependent on an inclination angle by which the motor vehicle is inclined in relation to a horizontal position; and the predetermined threshold value comprises at least one of an engine rpm threshold value and a transmission rpm threshold value.

2. The torque transfer system of claim 1, wherein the detection of the traction load by the traction load detecting device is based on monitoring a single traction-load characterizing value through the at least one traction load sensor device.

3. The torque transfer system of claim 1, wherein the detection of the traction load by the traction load detecting device is independent of a comparative mathematical evaluation of the input rpm rate, output rpm rate, input torque, and output torque.

4. The torque transfer system of claim 1, wherein the traction load detecting device is operative to send a second traction load signal to an optical device and the predetermined shift-control characteristic depends on said second traction load signal.

5. The torque transfer system of claim 4, wherein the second traction load signal is sent when the motor vehicle is connected to a trailer.

6. The torque transfer system of claim 5, wherein the optical device comprises an indicator light giving an indication based on the second traction load signal.

7. The torque transfer system of claim 4, wherein the second traction load signal comprises an electrical signal.

8. The torque transfer system of claim 1, wherein the traction load detecting device is operable to detect whether the motor vehicle is connected to a trailer.

9. The torque transfer system of claim 1, wherein the predetermined threshold value depends on the inclination angle signal in accordance with a predetermined inclination angle characteristic.

10. The torque transfer system of claim 1, wherein the predetermined threshold value depends on at least one of a direction of travel of the motor vehicle, the selected shift position, and the inclination angle signal.

11. The torque transfer system of claim 1, wherein under predetermined conditions the predetermined threshold value is set lower when the vehicle is traveling on a downward grade than when the vehicle is traveling on a level grade.

12. The torque transfer system of claim 1, wherein the traction load sensing device is arranged substantially on at least one of the transmission device and the control device.

13. The torque transfer system of claim 1, wherein the motor vehicle comprises a fuel tank containing a fuel and the at least one traction load sensor device comprises at least one fuel tank sensor arranged in the fuel tank.

14. The torque transfer system of claim 13, wherein the at least one fuel tank sensor is operable to detect a fill level.

15. The torque transfer system of claim 14, wherein the at least one fuel tank sensor comprises a first fuel tank sensor for detecting a first fill level substantially at the center of a fuel surface and at least one further fuel tank sensor for detecting at least one further fill level at an eccentric location of the fuel surface.

16. The torque transfer system of claim 14, wherein the at least one fuel tank sensor comprises a plurality of fuel tank sensors for detecting a plurality of fill levels at different places of a fuel surface and for generating a corresponding plurality of fill level signals, and wherein at least part of the time the inclination angle is determined based on differences between the fill level signals.

17. The torque transfer system of claim 14, wherein the at least one fuel tank sensor generates a fill level signal that changes with fluctuations in the fill level, wherein the control device monitors and evaluates the fill level fluctuations within time windows of different length in accordance with a predetermined fill level evaluation characteristic, wherein said evaluation of fill levels encompasses at least one of the phenomena consisting of a change in fill level within one of the time windows, a change in fill level from one to another of the time windows, and a change in a time gradient of the fill level from one to another of the time windows, and wherein based on said evaluation the control device can distinguish a change in the fill level signal due to a change of fuel volume in the fuel tank from a change in the fill level signal due to a change of the inclination angle.

18. The torque transfer system of claim 17, wherein the time windows of different length comprise at least a first, second and third time window which at least partially overlap each other, the first time window extending over a long time period, the second time window extending over an intermediate time period, and the third time window extending over a short time period, and wherein the change in fill level detected within the first time window is used to determine the change of fuel volume in the tank, the change in fill level detected within the second time window is used to determine the change of the inclination angle, and the change in fill level detected within the third time window is used to determine short irregularity in travel conditions of the vehicle.

19. The torque transfer system of claim 13, wherein the at least one fuel tank sensor is operable at least part of the time to detect a position change of the fuel within the fuel tank, said position change serving to determine the inclination angle.

20. The torque transfer system of claim 1, wherein the at least one traction load sensor device comprises at least one acceleration sensor.

21. The torque transfer system of claim 20, wherein the at least one acceleration sensor comprises a collision sensor.

22. The torque transfer system of claim 20, wherein the at least one acceleration sensor is operable at least part of the time to determine an actual acceleration of the motor vehicle.

23. The torque transfer system of claim 22, wherein the actual acceleration comprises at least part of the time a gravitational acceleration component acting in a direction of the inclination angle while the motor vehicle is standing still.

24. The torque transfer system of claim 20, wherein the control device determines the inclination angle at least part of the time dependent on a change in acceleration according to a predetermined acceleration characteristic.

25. The torque transfer system of claim 20, wherein the control device determines the inclination angle at least part of the time dependent on at least one of the acceleration and the change in acceleration, taking into account that $a = g \times \sin \alpha$, where a represents an effective acceleration of the motor vehicle, $\alpha$ represents the inclination angle, and g stands for gravitational acceleration.

26. The torque transfer system of claim 20, wherein the control device determines the inclination angle at least part of the time dependent on the acceleration as determined by the acceleration sensor and at least one further characteristic operating value.

27. The torque transfer system of claim 26, wherein the at least one further characteristic operating value comprises a travel acceleration determined from at least one wheel rpm rate.

28. The torque transfer system of claim 1, wherein the control device is further operable under predetermined conditions and dependent on the traction load signal to control predetermined characteristic operating values of the motor vehicle in accordance with a predetermined operating characteristic.

29. The torque transfer system of claim 28, wherein the predetermined conditions comprise that the traction load signal is in a predetermined traction load signal range and the controlling of the predetermined characteristic operating values comprises changing of a start-up rpm rate of the engine.

30. The torque transfer system of claim 29, wherein the predetermined traction load signal range comprises traction load signals larger than a predetermined traction load threshold signal and the changing of the start-up rpm rate of the engine comprises increasing said start-up rpm rate to a value where the engine delivers a maximum engine torque.

31. The torque transfer system of claim 29, wherein the control device under certain conditions regulates the clutch device in such a manner that the latter transmits a crawl torque of a magnitude that depends on the traction load signal.

32. The torque transfer system of claim 31, wherein the regulating of the clutch device comprises increasing the crawl torque if the traction load signal indicates a predetermined traction load increase.

33. The torque transfer system of claim 31, wherein the control device under predetermined conditions selects from a plurality of drive-behavior control programs for controlling the motor vehicle, and wherein said selection depends on the at least one traction load signal.

34. The torque transfer system of claim 1, wherein the at least one traction load signal comprises an analog traction load signal.

35. The torque transfer system of claim 1, wherein the at least one traction load signal comprises a digital traction load signal.

36. A method of operating at least one of a torque transfer system and an engine of a motor vehicle, comprising the steps of:
  a) detecting a traction load of the motor vehicle according to a predetermined characteristic; and
  b) regulating at least one characteristic operating value of the engine according to a predetermined characteristic dependent on the traction load;
    wherein the at least one characteristic operating value of the engine comprises a start-up rpm rate.

37. A method of operating a motor vehicle comprising the step of utilizing the torque transfer system of claim 1.

* * * * *